(12) United States Patent
Champeau

(10) Patent No.: US 7,049,949 B2
(45) Date of Patent: May 23, 2006

(54) METHOD FOR ADVOCATING PARTICULAR TIRES FOR USE AND FOR CALCULATING ON SITE INFLATION PRESSURES OF SAID TIRES FOR A CONSTRUCTION VEHICLE

(75) Inventor: Christian Champeau, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/938,785

(22) Filed: Sep. 13, 2004

(65) Prior Publication Data

US 2005/0080777 A1    Apr. 14, 2005

Related U.S. Application Data

(63) Continuation of application No. PCT/EP03/02347, filed on Mar. 7, 2003.

(30) Foreign Application Priority Data

Mar. 13, 2002  (FR)  ................... 02 03272

(51) Int. Cl.
    *G08G 1/09*  (2006.01)
(52) U.S. Cl. .................... 340/442; 702/29; 73/146.5
(58) Field of Classification Search ........... 707/3, 707/104.1, 4, 5; 340/442, 443; 73/146.3, 73/146.5, 146; 701/50, 29
See application file for complete search history.

(56) References Cited

U.S. PATENT DOCUMENTS

| | | | | |
|---|---|---|---|---|
| 3,330,570 | A | * | 7/1967 | Sherrill .................... 280/6.159 |
| 5,736,939 | A | * | 4/1998 | Corcoran .................... 340/905 |
| 6,144,295 | A | * | 11/2000 | Adams et al. .............. 340/442 |
| 6,868,358 | B1 | * | 3/2005 | Brown, Jr. .................. 702/138 |
| 2004/0011445 | A1 | * | 1/2004 | Harm ....................... 152/152.1 |
| 2004/0243446 | A1 | * | 12/2004 | Wyatt ........................... 705/2 |

FOREIGN PATENT DOCUMENTS

| | | |
|---|---|---|
| DE | 40 14 379 | 11/1991 |
| EP | 1 044 828 | 10/2000 |

OTHER PUBLICATIONS

Bader, Charles D., "Modern Tire Management", Grading and Excavation Contractor, Mar. 2001 (<URL:www.forester.net/gx_0011_modern.html>).

* cited by examiner

Primary Examiner—Frantz F. Jules
(74) Attorney, Agent, or Firm—Buchanan Ingersoll PC

(57) ABSTRACT

A method and a system for advocating tires and for calculating on site inflation pressures of the said tires for a so-called construction vehicle, in which, using data on the vehicles, the tires and the conditions of use, an estimate of the load on the bucket of the construction vehicle is calculated and the appropriate type of tires and inflation pressures therefore are chosen.

10 Claims, 2 Drawing Sheets

Application is a continuation of International PCT/EP03/02347 filed on Mar. 7, 2003 and which claims priority from patent application Ser. No. 02/03272 filed in France on Mar. 13, 2002.

METHOD FOR ADVOCATING PARTICULAR TIRES FOR USE AND FOR CALCULATING ON SITE INFLATION PRESSURES OF SAID TIRES FOR A CONSTRUCTION VEHICLE

BACKGROUND

This application is a continuation of International PCT/EP03/02347 filed on Mar. 7, 2003 and which claims priority from patent application Ser. No. 02/03272 filed in France on Mar. 13, 2002.

The present invention relates to the technical sector of vehicles known as construction vehicles, such as loaders, dumpers, lorries and similar vehicles which are suitable for loading, unloading and/or transporting materials such as, in particular, ores or similar materials, and which for the sake of simplicity are called "vehicles" hereinbelow.

The technical problem arising is to determine quickly and accurately on site, that is to say at the building site, the optimum values for the internal pressure of tires which should be set up for the front wheels (AV) and back wheels (AR) of these vehicles as a function of a very large number of parameters relating to the vehicle, the way it is used, the terrain on which it is to travel, the parameters of the available tires, the characteristics of the load and similar factors well known to those skilled in the art.

Basic methods are currently known, consisting essentially in making a visual assessment of the behavior of the vehicle under load and deducing the pressures which seem most appropriate therefrom, by manual and empirical calculation. This is highly imprecise.

It is known that the risk associated with such vehicles under load, in particular front-end loaders, is that they may tip forwards under the effect of an excessively large load in the bucket and inappropriate parameters in selecting the tires and pressure.

On the ground, those skilled in the art will of course tend to recommend smaller loads in order to avoid this risk, and hence of course a markedly lower output from the vehicle, but also of course inflation pressures for tires which are suitable for the maximum load (tipping) and of course a greater sensitivity to cuts in the tires and hence lower output.

It is also known that too low a pressure must not be advocated, but that too high a pressure must not be advocated either, since in this latter case there then arises a risk of the tire being cut or torn on certain terrains.

Other factors to take into account are the stability of the vehicle, which those skilled in the art know they can improve by increasing the operating pressure, but those skilled in the art also know that this has a negative effect on the vehicle's flotation, that is to say its capacity to travel on loose or soft terrain or even muddy terrain.

It will therefore be appreciated that the parameters are not merely extremely numerous but in some cases incompatible. There are moreover numerous types and makes of vehicles, tires available, and so on, which make solving the problem even more complicated.

There is thus a recognized and major need for a method and a system which are simple and accurate and ensure that operations are safe and optimized.

SUMMARY OF INVENTION

The invention relates to a method and a system of this kind which make use of certain data chosen from the parameters listed above, apply them to "correlated" equations, correct the estimate made from a visual assessment or a more accurate measurement of the behavior of the vehicle under load, all this being iterated until the calculations of the method and the impression (or measurement) made by the operative as regards the behavior under load are in reasonable agreement.

The term "in reasonable agreement" is used here to indicate that at the end of one, two or more iterative corrections the operative considers that he has reached a solution calculated using the method and system which corresponds to the actual behavior of the vehicle with certain approximations and within the tolerance that his knowledge of the field can allow him.

The operative then decides that the solution calculated is satisfactory.

The invention therefore relates to a method of advocating tires on site and of calculating on site inflation pressures of the said tires for a so-called construction vehicle having a front axle, a rear axle and a bucket intended to receive a load, in particular of ore or similar materials. This method is characterized in that:

the type of vehicle concerned is identified and a search is made to find its known manufacturer characteristics;

the nature of the material to be loaded is identified and its density DM estimated;

an estimate is made of the filling level of the bucket TR in conditions of maximum load for use on the site in question;

the load CG in the bucket is calculated from the capacity of the bucket VG and the values estimated for DM and TR (equation 1);

the overload on the front axle V is calculated from the tipping load of the said vehicle (equation 3);

the value obtained for the overload on the front axle V is verified from observations made when the vehicle is loaded to its maximum load for use on the site in question and when empty;

if the result of the verification is negative, the estimates of the density of the loaded material DM and/or the filling level of the bucket TR are corrected and the verification of the value obtained for the overload on the front axle V is performed again; and if the result of the verification is positive, the estimate of the maximum load on the bucket CG is validated in the conditions of use on the site in question;

this value for the maximum load on the bucket CG is used to calculate the total loads on the front axle ZAV and the rear axle ZAR by way of two equations for load transfer (equations 6.1 and 6.2), using data from the manufacturer of the said vehicle;

the load on each front tire is calculated by dividing the total load on the front axle by two, and a load value is chosen for the tires of the rear axle, a "safety" value greater than the load on the rear axle which is calculated divided by two, which may be as little as half the datum given by the vehicle manufacturer for the load on the rear axle when empty, and is preferably equal to this last value;

the conditions of the terrain on the site concerned and the average speed of use of the vehicle are determined;

a search is made of the data known from tire manufacturers for the type or types of tires and characteristics of tires (type, tread pattern and quality of the rubber compound) which best correspond to the loads calculated for the tires of the front axle and the rear axle, the conditions of use of the vehicle on the site concerned, in particular the conditions of the terrain, and the average speed of use;

a search is made of the data known from tire manufacturers for the operating pressures of the tires selected in the previous step on the front axle and rear axle respectively, corresponding to the loads calculated for the tires of the front axle and rear axle; and the operating pressures and the tires for the said vehicle are chosen.

The method according to the invention makes use of the value of the maximum load of the bucket in conditions of use on site in order to determine the types of tire suitable for use on the site in question. This value CG is obtained from estimating a variable, for example the level of filling of the bucket TR, associated with the calculation of another variable, such as the overload on the front axle V resulting from the load on the bucket, expressed in % of the tipping load. A comparison between these two variables and the observations made on site is what allows the operative to correct the estimated values (TR, DM) and validate the value obtained for the load on the bucket with a much greater level of accuracy than that usually resulting from estimating a single variable.

The invention also relates to a similar method in which, after identifying the nature of the material to be loaded and estimating its density DM, an estimate is made of the overload on the front axle V in conditions of maximum load during use of the bucket from observations made when the vehicle is loaded to its maximum load for use on the site in question and when empty, and then the level of filling of the bucket TR in these conditions of use is calculated from the capacity of the bucket VG of the vehicle and from the previously estimated values DM and V.

As above, the operative will validate the value obtained for the load on the bucket CG from a joint comparison of the value estimated for V and that calculated for TR with his observations on site. This validation is performed as above, with successive corrective iterations of the estimated values.

The method according to the invention may also consist, before validation of the value of the load on the bucket CG, in successively applying the corresponding steps in the two procedures above in order to improve the accuracy of the estimate of this load on the bucket CG.

Preferably, estimating and/or verifying the value of the overload on the front axle V is carried out on the basis of measuring the distance using the sagging of at least one of the tires of the vehicle, between the sag value with no load and the sag value when the tire in question is loaded. A relative value is thus used, which greatly improves the accuracy of measurement and hence the estimate or verification of the variable V is very reliable.

Most preferably, this variation in the level of sagging will be measured by an optical method, for example with a laser pen (or accurate measuring instrument of this type) which is positioned at a stable point on the wheel, with heights read off from a calibrated rule positioned opposite the laser beam. Conversely, a card could be placed on the wheel with the laser pen opposite this card. Those skilled in the art will have an understanding of these simple devices, and will have others at their disposal.

Preferably, the method according to the invention is such that it also includes a step of correcting and/or determining the limits for use of the inflation pressures proposed, this step being chosen from the following operations:

correction of the speed of the vehicle; and/or correction of the stability factor and the flotation factor; and/or correction of the type of terrain;

(these three corrections giving rise to a correction of the pressures from databases from the tire manufacturers); and/or choice of a final correction of the pressure.

In fact, once the parameters from the vehicle manufacturer and the conditions of use have been entered and the advocated pressure values for certain types of tires have been obtained by the method above, it is in general important to determine the limits for use of the vehicle for safety reasons.

If desired, the influence of a higher or lower speed on the vehicle than that provided will therefore be explored successively (and independently); it will therefore be advisable to select from the list advocated for the vehicle a different type of tire, rubber compound or tread pattern or even different pressures.

Similarly, the parameters for the stability (which may be improved by increasing the internal pressure of the tires) and for the flotation of the vehicle (that is to say its suitability for traveling safely on terrain which is loose, soft, muddy, etc.) will be explored. Since these two factors are not compatible, it is important to verify that an improvement in the flotation made necessary for example by the type of terrain encountered, or the risk of bad weather, etc., will not compromise stability or vice versa. In this case, too, the operative will advocate a different combination of tire parameters with a larger tolerance.

The type of terrain may also bring about serious problems with safety and damage to the tires by cuts or tears if the pressure is too high. Here too, correcting the initial terrain factor will allow the behavior of the vehicle to be explored within certain limits of the conditions, in order to verify that the implementation is still sound. In the opposite case a different advocated result will be selected.

It goes without saying that in all cases where this "exploration" reaches a risk zone an alarm is triggered, matched to an appropriate message on the system screen.

According to a particular embodiment, a database A is created with all the known data from the manufacturers of the vehicles, and this database A includes at least the following elements:

a list of vehicle references with, for each one:
weight on front axle when empty, VAV;
weight on rear axle when empty, VAR;
in-line tipping load, CB;
dimension of authorized tire(s);
capacity of the bucket VG, in $m^3$; and
capacity of the bucket in kg.

As known by those skilled in the art, the concept of in-line wheels (or in-line tipping load) corresponds to a configuration of the vehicle in which the axes of the wheels are perpendicular to the longitudinal axis of the vehicle, in particular the front axle. This is the case, for example, when the vehicle is moving towards the lorry and begins to back under load. The tipping load is highest in a case of this kind.

The configuration with "out-of-line wheels" corresponds to the situation when the vehicle maneuvers by pivoting at least two wheels, in particular the two front wheels. In this case, those skilled in the art know that the resulting variation in the centre of gravity gives rise to a lower tipping load. This tipping load with out-of-line wheels may optionally be used to give a maximum limit which should not be exceeded for the bucket load value.

This data is necessarily known (vehicle manufacturer data) in the case of the in-line wheel configuration (compulsory vehicle manufacturer data—tipping load) and very generally known as regards the configuration with out-of-line wheels (again, vehicle manufacturer data).

According to a particular embodiment, a database B is created with the known material data, and this database B includes at least the following elements:

data relating to the usual materials involved, with their densities DM.

In the best current embodiment, this database includes 24 types of materials with their usual density in kg/m$^3$, with the proportions of ore and deads, and/or the densities DM of the materials to be loaded in kg/m$^3$. This database thus allows work to be carried out using the densities of the ores associated with the content of these ores at the site in question, and can also directly give the density DM of the materials to be loaded at the site; this last value includes the content and density of complementary or dead rocks which will have to be loaded.

This database allows the operative to gain considerable time and accuracy for the accuracy of the value of the load on the bucket CG obtained in accordance with the method of the invention.

It goes without saying that if a special case arises the database can be modified on site by the operative.

According to a particular embodiment, a database C is created with the data about the usual terrain, and this database C includes at least the following elements:

a list of the terrain conditions and their principal characteristics, where appropriate with a subjective indication of quality.

With the best current embodiment, a proposal of six terrain conditions is made to the operative, which cover almost all if not all of the situations encountered. If a special case arises the database can be modified on site by the operative.

Preferably, also created is a database D of tire data from the tire manufacturers, and this database D includes at least the following elements:

a list of all the tires in the range GC with, for each one:
  dimension;
  tread pattern;
  type of rubber compound;
  range of use as a function of terrain;
  limit of use as a function of speed;
  load limit;
  limit of pressure;
  pressure as a function of load.

According to a particular embodiment which is the best current embodiment, equations 1 and 3 are as follows:

$$CG = VG \times DM \times \frac{TR}{100}; \quad \text{(equation 1)}$$

$$V = \frac{CG}{CB} \times 100; \quad \text{(equation 3)}$$

where CG=bucket load
  VG=capacity of the bucket in m$^3$,
  DM=density of the material to be loaded in kg/m$^3$,
  TR=level of filling of the bucket in %,
  V=estimate of the overload on the front axle resulting from the load on the bucket, expressed as % of the tipping load of the vehicle, and
  CB=tipping load of the vehicle in kg.

According to a particular embodiment which is the best current embodiment, the load transfer equations are as follows:

$$ZAV = VAV + \left(\frac{CB + VAR}{CB}\right) \times CG; \quad \text{(equation 6.1)}$$

and $$ZAR = VAR - \left(\frac{VAR}{CB}\right) \times CG; \quad \text{(equation 6.2)}$$

where ZAV=load on the front axle,
  ZAR=load on the rear axle,
  VAV=load on the front axle when empty,
  CG, CB, VAR are as defined above.

According to a particular embodiment which is the best current embodiment, equations 2 and 4 are as follows:

$$CG = \frac{V}{100} \times CB; \quad \text{(equation 2)}$$

$$TR = \frac{CG}{VG \times DM} \times 100. \quad \text{(equation 4)}$$

Preferably, the average speed speed is calculated from equation 5 below:

$$\text{speed} = L \times Nb \quad \text{(equation 5)};$$

where:
  L=length of the cycle for loading/unloading;
  Nb=number of cycles per hour;

the other variables being as defined above.

Those skilled in the art will appreciate that, with the exception of entering parameters or corrected parameters, the said operations are carried out using at least one algorithm. It goes without saying that designing this algorithm will not pose any problems for those skilled in the art.

The invention also relates to a system for advocating tires on site and for calculating on site inflation pressures for the said tires, for a so-called construction vehicle having a front axle, a rear axle and a bucket intended to receive a load, in particular of ore or similar materials, for implementing the method above. This system is characterized in that it includes an electronics unit, at least one memory element and at least one algorithm which are suitable for:

containing equations 1 to 6;
utilizing them; and
calculating by way of the said equations a value for the load CG on the bucket and loads on the tires of the front and rear axles.

It goes without saying that those skilled in the art will have no difficulty in designing the electronics unit, memory elements and capacities, and algorithm(s).

According to a particular embodiment, the system also includes means for containing the databases A to D.

Preferably, the system also comprises an algorithmic means in order to identify from the databases D (tires) and A (vehicle manufacturer), the most appropriate values among those chosen for average speed and the characteristics of the terrain, and values for the loads on the tires of the front and rear wheels respectively, the type or types of tires, tread pattern and quality of the rubber compound, and means of displaying these.

Those skilled in the art will know how to create an algorithm of this kind without any difficulty.

According to a particular embodiment, the said system also comprises an algorithmic means in order to identify the optimum value for the inflation pressure of the said tire or tires selected, means of displaying these values, and means of selecting each of the values and where appropriate making a final correction, and where appropriate printing or transferring a file.

BRIEF DESCRIPTION OF DRAWINGS

The invention will be more readily understood on reading the description with the attached drawing, in which.

DETAILED DESCRIPTION OF A PREFERRED EMBODIMENT

In the text below, a loader will be used as an example.

The method according to the invention may very easily be loaded onto a laptop computer using a specific program or parameterising a software application such as a spreadsheet.

Figure 1:
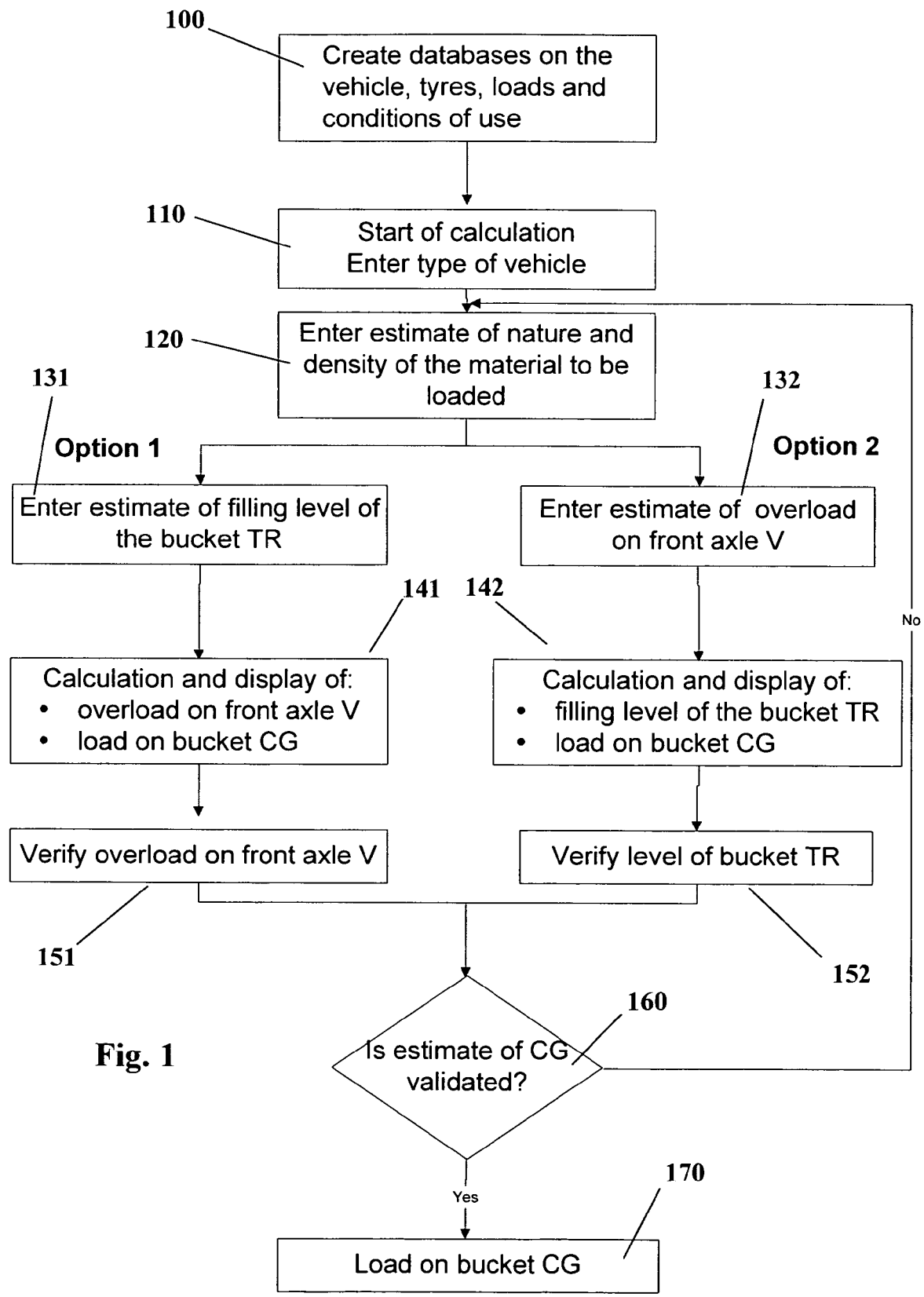
FIG. 1 shows, in the form of a summarizing flow chart, the first part of the method according to the invention.

The first part of the method according to the invention is shown in FIG. 1.

The operative will first of all create the databases A to D (whereof the majority are in any case already in existence, such as the databases of vehicle manufacturers, ore being loaded into a bucket, tires, etc.), but it may be necessary to complete or modify on site in particular specific characteristics of the ore, particular characteristics of the vehicle in some cases, for example the capacity of the bucket, which the user may have modified, the condition of the terrain, etc. Step 100.

He then starts the system up by entering the type of vehicle in question (step 110).

He identifies the nature of the ore on the site and enters an estimate of the density of the material to be loaded (step 120). As has been said, the algorithm of the system may use either a value for the density of the material to be loaded DM or optionally the density of the ore and its proportion in the material to be loaded.

According to a first option, the operative enters an estimate of the level of filling of the bucket TR (step 131). This estimate is obtained from a visual observation of the vehicle loaded to its maximum load on the site. It may also be confirmed by discussion with the person operating the vehicle.

The system then calculates and displays the overload on the front axle V, expressed as a percentage of the tipping load CB of the vehicle (obtained from database A) and the load on the bucket CG (step 141). This overload V corresponds to the increase in load on the front axle between the situations when the bucket is empty and when it is loaded.

The load on the bucket CG is calculated using equation 1 below:

$$CG = VG \times DM \times \frac{TR}{100};$$

in which VG is the capacity of the bucket in m³ and DM is an estimate of the density of the material to be loaded in kg/m³.

The overload on the front axle V is calculated using equation 3 below:

$$V = \frac{CG}{CB} \times 100;$$

in which CB is the in-line tipping load, obtained from the database A.

The operative then verifies whether the value calculated V corresponds properly to his own visual observations or his own measurements (step 151).

If the operative validates the calculation of V, he also validates the calculation of the load on the bucket CG (step 160). This first part thus has the objective of providing a validated estimate of this bucket load (step 170).

If the operative thinks that the overload on the front axle V and/or the load on the bucket CG are not satisfactory, he goes back to step 120.

According to a second option, after step 120 the operative may enter an estimate of the overload on the front axle V (step 132). This estimate may be based on visual observations made by the operative between the "empty" and "maximum load" situations of use for the site and the vehicle in question. It may also be based on measurements, as will be described.

The system then calculates and displays the filling level of the bucket TR which is achieved, for example 70%, and the load on the bucket CG (step 142).

The load on the bucket is calculated using equation 2 below:

$$CG = \frac{V}{100} \times CB;$$

in which CB is the tipping load of the vehicle (obtained from database A).

The level of filling of the bucket TR is calculated using equation 4 below:

$$TR = \frac{CG}{VG \times DM} \times 100;$$

in which, as above, VG is the capacity of the bucket in m³ (obtained from database A) and DM is the density of the material to be loaded in kg/m³ (obtained from estimate).

The operative then verifies whether the value calculated for TR corresponds properly to his own visual observations and discussions with the person operating the vehicle (step 152).

If the operative validates the calculation of TR, he also validates the calculation of the load on the bucket CG (step 160).

If the operative thinks that the level of filling TR and/or the load on the bucket CG are not satisfactory, he goes back to step 120.

It goes without saying that in this iterative procedure he has a free choice of using option 1 or option 2, or one after the other in whatever order he chooses.

Advantageously, the system includes alerts which are triggered when one of the values entered or calculated is too high: for example, if the value V is such that the vehicle becomes unstable (load on the bucket is greater than the capacity of the bucket expressed by mass, or greater than the tipping load in configuration with out-of-line wheels, etc.). These alerts cooperate to give a good estimate of the bucket load.

As has been indicated, the value V may be estimated or validated by visual observations or measurements. Very preferably, the following measurements are carried out for V:

- with the vehicle in question equipped with a known type of tire inflated to a given pressure and loaded at the level of filling provided for the bucket, the operative measures a wheel reference (height with respect to the ground), preferably using an accurate measuring system such as a laser pen;
- the bucket of the vehicle is then emptied without being moved and the operative measures the same reference of height of wheel to ground when empty; and
- the operative enters in the system again either the two heights measured, with the system subtracting to calculate dH, or entering dH directly.

The measurement of dH corresponds to the variation in the sagging of the tire between the empty and loaded situations. Given that the characteristics of the tire in question and the effective inflation pressure during measurement are known, the system determines the variation in load undergone by the tire between these two conditions. It then calculates the total overload on the front axle and standardizes this value by dividing by the tipping load of the vehicle. This gives a very good estimate of the variable V.

The importance of the relative measurement dH is that it is unencumbered by errors of measurement of sagging of the tire which may result from the amount of wear of the tire, the tire sinking into the ground, etc.

Figure 2:
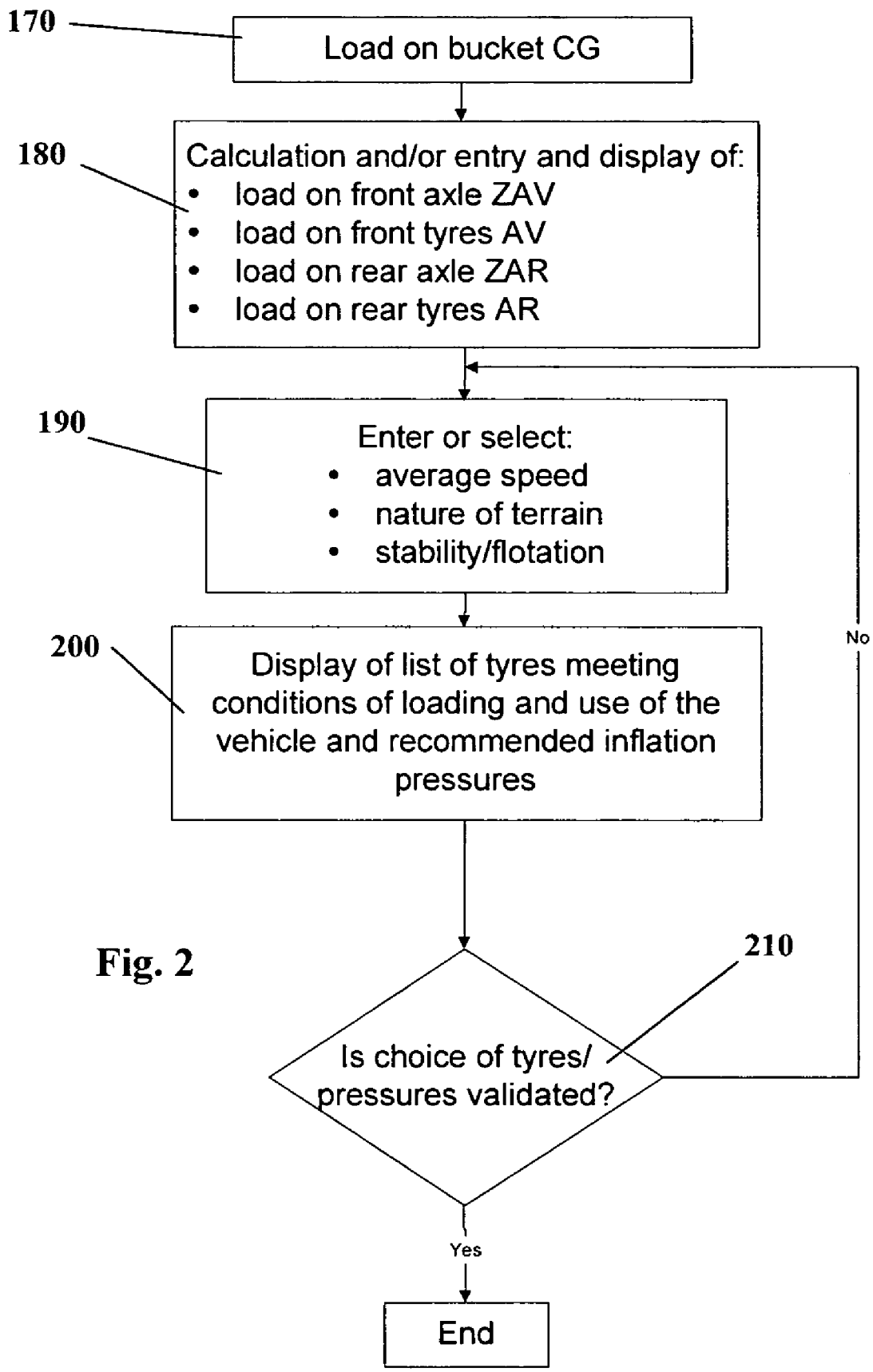
FIG. 2 shows, in the form of a summarizing flow chart, the second part of the method according to the invention.

FIG. 2 shows the second part of the method according to the invention.

Once the load on the bucket CG has been validated (step 170), the system calculates and displays the loads on the front and rear axles and the load on each front tire. As regards the load on each rear tire, the system can systematically predict the half load when empty on the rear axle or prompt the operative for any other value he chooses (step 180).

The total load on the front axle is calculated using equation 6.1:

$$ZAV = VAV + \left(\frac{CB + VAR}{CB}\right) \times CG;$$

and the total load on the rear axle is calculated using equation 6.2:

$$ZAR = VAR - \left(\frac{VAR}{CB}\right) \times CG.$$

The variables of these two equations for load transfer have already been defined.

In step 190, the system prompts the user to enter the average speed of the vehicle and to indicate the nature of the terrain. Six choices are presented as a function of the harshness of the terrain.

Based on this data and the load values, in step 200 the system identifies in the databases A (vehicle manufacturer) and D (tire) all the appropriate tires, and the recommended inflation pressures, as a function of the maximum loads calculated. This search may be carried out among the tires authorized for the vehicle concerned (generally, a list of ten or so possible references, including the type, trademark, quality of rubber compound, type of tread pattern, range of pressures, etc.). If necessary, the operative may also choose to widen his search beyond the tires authorized by the vehicle manufacturer.

As a function of priority parameters specified in the algorithm, the system can display a list of selections in decreasing order of preference, for example: preferred, option 1, option 2, etc.

The list appears in decreasing order of the dimensions authorized by the vehicle manufacturer (standard, option 1, option 2, etc.) and for each dimension, as a function of priority parameters specified in the algorithm, in decreasing order of preference of the selections.

The operative can then select one of the options displayed, and the system then displays the inflation pressures calculated as a function of the factors of load on the wheel calculated above for the front and rear tires.

The operative then validates the choices in step 210, and that ends the program.

We thus arrive at the advocated value sought with a level of accuracy and a level of safety and optimization (including that regarding the output of the vehicle) which is greatly superior to that obtained by the prior art.

This result can be further refined by exploring the limits of the advocated result, as explained above.

The operative has means (for example cursors or +/− ranges to click on) allowing him to impose values on the speed of the vehicle, stability factors (greater or lesser tire pressure) AND the incompatible parameter of flotation on soft or muddy terrain, and factors such as terrain type which were not the initial parameters. It is thus possible to verify, as explained above, that the advocated result is within the conditions present AND within a certain range of tolerances for the terrain, speed, stability/flotation. If the tolerance is considered to be too small in the case of one or more of the factors, exceeding the initial data provided, then the operative will have to search for a different tire selection among those displayed to give sufficient tolerance.

The extremely high accuracy of the method and the system according to the invention will therefore be apparent.

If the operative does not validate the choice proposed, he goes back to step 190 and can enter new values for the terrain or the speed or add a complementary criterion of stability and/or flotation of the tires.

Finally, the operative can impose a final advocated value for a pressure using his personal judgment.

The invention also covers all those embodiments and applications which will be directly obvious to those skilled in the art from reading the present application, from his or her own knowledge and where appropriate from simple routine tests.

The invention claimed is:

1. A method of advocating tires on a worksite and calculating on the worksite the inflation pressures of said tires for a construction vehicle having a front axle, a rear axle and a bucket intended to receive a load of material having a density DM, comprising the steps of:
- A) making an estimate of a filling level TR of the bucket in conditions of maximum load for use on the worksite;
- B) calculating a load CG created by the material filled to the filling level TR in the bucket from the bucket capacity VG and the estimated values for density DM and filling level TR;
- C) calculating an overload V on the front axle from a tipping load CB which would produce a tipping of said vehicle;
- D) verifying the value obtained for the overload V on the front axle from observations made when the vehicle is loaded to its maximum load for use on the worksite and when empty;
- E) if the result of the verification of step D is negative, correcting the estimates of the density DM and/or the filling level TR and performing again the verification of the value obtained for the overload V on the front axle;
- F) if the result of the verification of step D is positive, validating the estimate of the maximum load on the bucket CG in the conditions of use on the worksite;
- G) using the value for the maximum load CG to calculate total loads ZAV and ZAR on the front axle and the rear axle, respectively;
- H) calculating the load on each front tire by dividing by two the total load ZAV on the front axle calculated in step G, and choosing a load value for each tire of the rear axle greater than the total load ZAR on the rear axle divided by two;
- I) determining the conditions of the terrain on the worksite and the average speed of use of the vehicle;
- J) making a search of data from tire manufacturers for the type or types of tires and characteristics of tires, including type, tread pattern and rubber compound quality, which most closely correspond to the loads calculated for the tires of the front axle and the rear axle, for the conditions of use of the vehicle on the worksite, including the conditions of the terrain, and the average speed of use;
- K) making a search of data from tire manufacturers for the operating pressures of the tires selected in step J on the front axle and rear axle respectively, corresponding to the loads calculated for the tires of the front axle and rear axle in step H; and
- L) choosing the operating pressures and the tires for said vehicle.

2. A method according to claim 1 wherein the verifying of the overload V on the front axle in steps D and E comprises measuring the sagging of at least one of the tires of the vehicle, between the sag value with no load and the sag value when the tire in question is loaded.

3. A method according to claim 1 wherein the load CG is calculated in step B from the equation $$CG = VG \times DM \times \frac{TR}{100}$$

and the overload V is calculated in step C from the equation $$CG = \frac{V}{100} \times CB$$

where CG=bucket load
VG=capacity of the bucket in $m^3$,
DM=density of the material to be loaded in $kg/m^3$,
TR=level of filling of the bucket in %,
V=estimate of the overload on the front axle resulting from the load on the bucket, expressed as % of the tipping load of the vehicle, and
CB=tipping load of the vehicle in kg.

4. A method according to claim 1 wherein the total loads ZAV and ZAR are calculated in step G from the equations:

$$ZAV = VAV + \left(\frac{CB + VAR}{CB}\right) \times CG$$

$$ZAR = VAR - \left(\frac{VAR}{CB}\right) \times CG$$

where ZAV=load on the front axle;
ZAR=load on the rear axle;
VAV=load on the front axle when empty;
VAR=load on the rear axle when empty;
CG=bucket load;
CB=tipping load of the vehicle in kg.

5. A method according to claim 1 wherein the average speed is determined in step I from the equation speed=L×Nb where:
L=length of the cycle for loading/unloading in km;
Nb=number of cycles per hour.

6. A method of advocating tires on a worksite and calculating on the worksite the inflation pressures of said tires for a construction vehicle having a front axle, a rear axle and a bucket intended to receive a load of material having a density DM, comprising the following steps:
- A) making an estimate of an overload V on the front axle in conditions of maximum use of the bucket from observations made when the vehicle is at maximum load for use on the worksite and when empty;
- B) calculating and displaying a load CG in the bucket from a tipping load CB which would produce a tipping of the vehicle, from the equation:

$$CG = \frac{V}{100} \times CB$$

- C) calculating a filling level TR of the bucket under said conditions of maximum load for use from the capacity VG of the bucket of said vehicle and estimating the values above DM and V from the equation:

$$TR = \frac{CG}{VG \times DM} \times 100$$

- D) verifying the value obtained for the filling level TR of the bucket from observations made when the vehicle is loaded to its maximum load for use on the worksite;

E) if the result of the verification of step D is negative, correcting the estimates of the density DM and/or the overload V on the front axle and performing again the verification of the value obtained for the filling level TR of the bucket;

F) if the result of the verification of step D is positive, validating the estimate of the maximum load CG on the bucket in the conditions of use on the worksite;

G) using the value for the maximum load CG on the bucket validated in step F, to calculate total loads ZAV and ZAR on the front axle and the rear axle, respectively, from the equations $$ZAV = VAV + \left(\frac{CB + VAR}{CB}\right) \times CG$$

$$ZAR = VAR - \left(\frac{VAR}{CB}\right) \times CG$$

where ZAV=load on the front axle,
ZAR=load on the rear axle,
VAV=load on the front axle when empty,
VAR=load on the rear axle when empty H) calculating the load on each front tire by dividing by two the total load ZAV on the front axle calculated in step G, and choosing a load value for each tire of the rear axle greater than the total load ZAR on the rear axle divided by two;

I) determining the conditions of the terrain on the worksite and the average speed of use of the vehicle;

J) making a search of data from tire manufacturers for the type or types of tires and characteristics of tires, including type, tread pattern and the rubber compound quality, which best correspond to the loads calculated for the tires of the front axle and the rear axle, for the conditions of use of the vehicle on the worksite, including the conditions of the terrain, and the average speed of use;

K) making a search of data from tire manufacturers for the operating pressures of the tires selected in step J on the front axle and rear axle respectively, corresponding to the loads calculated for the tires of the front axle and rear axle in step H; and L) choosing the operating pressures and the tires for said vehicle.

7. A method according to claim 6 wherein the estimating and/or verifying of the overload V on the front axle in steps D and E comprises measuring the sagging of at least one of the tires of the vehicle, between the sag value with no load and the sag value when the tire in question is loaded.

8. A method according to claim 6 wherein the load CG is calculated in step B from the equation $$CG = VG \times DM \times CB$$

and the overload V is calculated in step A from the equation $$CG = \frac{V}{100} \times \frac{TR}{100}$$

where CG=bucket load
VG=capacity of the bucket $m^3$,
DM=density of the material to be loaded in $kg/m^3$,
TR=level of filling of the bucket in %,
V=estimate of the overload on the front axle resulting from the load on the bucket, expressed as % of the tipping load of the vehicle, and
CB=tipping load of the vehicle in kg.

9. A method according to claim 6 wherein the total loads ZAV and ZAR are calculated in step G from the equations:

$$ZAV = VAV + \left(\frac{CB + VAR}{CB}\right) \times CG$$

$$ZAR = VAR - \left(\frac{VAR}{CB}\right) \times CG$$

where ZAV=load on the front axle;
ZAR=load on the rear axle;
VAV=load on the front axle when empty;
VAR=load on the rear axle when empty;
CG=bucket load;
CB=tipping load of the vehicle in kg.

10. A method according to claim 6 wherein the average speed is determined in step I from the equation $$speed = L \times Nb$$

where:
L=length of the cycle for loading/unloading in km;
Nb=number of cycles per hour.

* * * * *